United States Patent
Shi et al.

(10) Patent No.: US 7,268,771 B2
(45) Date of Patent: Sep. 11, 2007

(54) PANEL DISPLAY SCREEN WITH TOUCH CONTROL FUNCTION

(75) Inventors: Xuanming Shi, Chungli (CN); Guangliang Liu, Chungli (CN)

(73) Assignee: Taiguen Technology (Shen-Zhen) Co., Ltd., Shenzhen (CN)

( * ) Notice: Subject to any disclaimer, the term of this patent is extended or adjusted under 35 U.S.C. 154(b) by 509 days.

(21) Appl. No.: 10/490,336

(22) PCT Filed: Aug. 2, 2002

(86) PCT No.: PCT/CN02/00532

§ 371 (c)(1),
(2), (4) Date: Mar. 22, 2004

(87) PCT Pub. No.: WO03/027823

PCT Pub. Date: Apr. 3, 2003

(65) Prior Publication Data

US 2004/0239642 A1    Dec. 2, 2004

(30) Foreign Application Priority Data

Sep. 25, 2001    (CN) ............................... 01 2 64012

(51) Int. Cl.
*G09G 5/00*    (2006.01)

(52) U.S. Cl. ...................... 345/173; 345/174; 345/175; 345/176; 345/179

(58) Field of Classification Search ........ 345/173–176, 345/179, 180, 182, 183; 178/18.03, 18.02, 178/19; 713/183, 194; 349/58, 895, 700; 438/108; 324/338; 343/753, 795, 853, 909, 343/895, 700, 867; 375/259; 235/487

See application file for complete search history.

(56) References Cited

U.S. PATENT DOCUMENTS

| | | | | |
|---|---|---|---|---|
| 4,644,366 A | * | 2/1987 | Scholz | ....................... 343/895 |
| 5,109,354 A | * | 4/1992 | Yamashita et al. | .......... 708/110 |
| 5,149,919 A | * | 9/1992 | Greanias et al. | ......... 178/18.02 |
| 5,386,219 A | * | 1/1995 | Greanias et al. | ............ 345/174 |
| 5,617,103 A | * | 4/1997 | Koscica et al. | ...... 343/700 MS |
| 5,693,914 A | * | 12/1997 | Ogawa | .................... 178/18.07 |
| 5,708,679 A | * | 1/1998 | Fernandes et al. | .......... 375/259 |
| 6,285,337 B1 | * | 9/2001 | West et al. | .................. 343/853 |
| 6,417,813 B1 | * | 7/2002 | Durham | ....................... 343/753 |
| 6,490,012 B1 | * | 12/2002 | Takatani | ...................... 349/12 |
| 6,512,487 B1 | * | 1/2003 | Taylor et al. | ................ 343/795 |
| 6,607,135 B1 | * | 8/2003 | Hirai et al. | .................. 235/487 |
| 6,787,715 B2 | * | 9/2004 | Chao et al. | .............. 178/18.01 |
| 6,849,810 B2 | * | 2/2005 | Chao et al. | .............. 178/18.03 |

(Continued)

*Primary Examiner*—Bipin Shalwala
*Assistant Examiner*—Prabodh Dharia
(74) *Attorney, Agent, or Firm*—Duane Morris, LLP

(57) ABSTRACT

A flat panel display screen includes a flat panel display screen main unit and a touch control induction layer. The touch control induction layer is placed behind the flat panel display screen, wherein the touch control induction layer is constituted by an electromagnetic induction generation layer and a bottom support layer, wherein a base layer of the electromagnetic induction generation layer is an insulated flexible membrane, the surface of the membrane is printed with an electromagnetic induction antenna array, constituting a flexible membrane type electromagnetic induction generation layer, the output of that layer is connected to and controls the recognition circuit, and the input pen has an electromagnetic wave generation device. The present invention has a simple manufacturing technique, low cost, high precision, and long operating life.

16 Claims, 3 Drawing Sheets

U.S. PATENT DOCUMENTS

| | | | |
|---|---|---|---|
| 6,992,659 B2 * | 1/2006 | Gettemy | 345/173 |
| 7,007,168 B2 * | 2/2006 | Kubo et al. | 713/183 |
| 7,051,945 B2 * | 5/2006 | Empedocles et al. | 235/492 |
| 2001/0012645 A1 * | 8/2001 | Usami | 438/108 |
| 2001/0040560 A1 * | 11/2001 | Amron | 345/169 |
| 2002/0036621 A1 * | 3/2002 | Liu et al. | 345/173 |
| 2002/0053474 A1 * | 5/2002 | Chao et al. | 178/18.03 |
| 2003/0146881 A1 * | 8/2003 | Chao et al. | 343/867 |
| 2005/0237267 A1 * | 10/2005 | Brown et al. | 343/909 |

* cited by examiner

PANEL DISPLAY SCREEN WITH TOUCH CONTROL FUNCTION

FIELD OF TECHNOLOGY

The present invention relates to a touch screen, and in particular it relates to a flat panel display screen having a flexible membrane electromagnetic induction type touch control function. It belongs to the fields of electronics and electrical appliance technologies.

BACKGROUND TECHNOLOGY

As a consequence of the popularization and application of computer technology, the ways for converting information into electronic and digital forms are becoming more and more abundant. People have invented all kinds of methods for completing the initial process of digitization of information using various computer peripherals. For example, among the various keyboard input methods, speech recording input, graphics collection, etc., the most effective and most convenient is to perform input of information or command directly on a display screen by a method such as touching-pointing. For example, when making drawings using a computer, because the operation using a mouse cannot be just as dexterous as the operation of drawing on paper using a pen, it inevitably obstructs people from skillfully completing fine pattern production. By adopting a touch screen and directly operating on the display screen using a touch control pen, the operation is just like drawing on paper, and therefore the entire work is very easy to complete, and the effect is relatively good. Also, as a consequence of the continuous promotion of portable products, the various peripherals such as keyboard and mouse all are being omitted one by one. For example, the PDA basically does not have key operation, rather it entirely uses touch control pen operation of a touch screen to complete the various operations.

The existing touch control panel mainly uses an electrical resistance type method. In a concrete configuration thereof, a transparent touch membrane is provided on the outside of the display screen, and an electrical resistance layer is applied on the surface of the touch membrane; when an operation indicates a specific location on the touch membrane, a subsequently connected recognition and control circuit acquires knowledge through computation of a change of electrical potential of that location, and determines the coordinates of the indicated location, whereby the corresponding operation is executed. Because the existing electrical resistance type has problems such as high cost, complex technique, low precision, and unsuitability for performing handwritten input when realizing large-dimensional touch control panels, and because many times of operation causes physical damage such as wear, which leads to problems such as shortened operating life of the touch membrane, the applications of the touch screen are greatly limited.

DESCRIPTION OF THE INVENTION

The purpose of the present invention is to overcome the various drawbacks of the technology described above, and to provide a flat panel display screen having touch control function having simple manufacturing technique, low cost, high precision of recognition and collection, and long operating life.

The purpose of the present invention is realized thus: A flat panel display screen having electromagnetic induction touch control function, including a flat panel display screen main unit and a touch control induction layer, the output of the touch control induction layer being connected to a recognition circuit, and touch control operation of the display screen being operated by an electromagnetic input pen. The touch control induction layer is placed behind the flat panel display screen, wherein the touch control induction layer is constituted by an electromagnetic induction generation layer and a bottom support bracket layer, wherein a base layer of the electromagnetic induction generation layer is an insulated flexible membrane, the surface of the membrane is printed with an electromagnetic induction antenna array, constituting a flexible membrane type electromagnetic induction generation layer, the output of that layer is connected to and controls the recognition circuit, and the input pen has an electromagnetic wave generation device. The display screen is a flat panel display screen such as a plasma display screen or a liquid crystal display screen.

The surface area of the touch control induction layer and the surface area of the flat panel display screen may be different. According to different requirements, such as when part of the display screen is made as a touch input or touch operation area, the touch control induction layer may have a smaller surface area than the surface area of the flat panel display screen and be placed on one side behind the flat panel display screen, and it also may be placed on two sides or four sides of the display screen. Of course, the touch control induction layer also may have a larger surface area than the surface area of the flat panel display, such that the entire display screen and the periphery of the display screen may have touch control capability.

Concretely, the touch control induction layer is an electromagnetic induction generation layer, and while the display screen separates the operation pen and the induction layer, it does not at all influence the generation and transmission of induction signals.

The electromagnetic induction generation layer is an electromagnetic induction antenna array having a structure in which U-shaped antennas are arranged crosswise distributed respectively following X and Y axes.

Concretely, the electromagnetic induction antenna array of the electromagnetic induction generation layer is an electromagnetic induction antenna array on a flexible membrane, and in order to reduce cost, the electromagnetic induction antenna array is an electromagnetic induction antenna array printed with silver paste or a mixture of silver paste and carbon paste.

The electromagnetic induction antenna array has a one-sided or two-sided printed circuit structure, and it also may have more than one one-sided printed circuits superimposed.

In order to integrate an entire induction device, an insulating shielding isolating layer is provided behind the touch control induction layer, and a recognition circuit layer is provided behind the insulating shielding isolating layer.

A spatial gap is provided between the insulating shielding isolating layer and the recognition circuit layer, and it can further ensure the shielding effect.

Moreover, in order to increase the capabilities of wear resistance, and the like, of the surface of the display screen, a transparent protective layer or protective film is provided on the front surface of the display screen.

According to the technological scheme described above, it may be known that the present invention has advantages such as the following:

1. Because the electromagnetic induction layer is placed behind the screen display and a flexible membrane type printed electromagnetic induction type antenna array is adopted as a recognition induction element, it is easy to manufacture and the cost is low, also the greater the surface area, the more prominent the cost advantage is over the existing technology.

2. Because an electromagnetic induction type antenna array is used as a recognition induction element, its precision of recognition is high, and it is capable of accurately inputting mouse signals or pen track signals by means of pen touch or finger touch.

3. Signal generation is produced by means of an electromagnetic induction layer situated behind the display screen, and as a touch screen, a protective film is placed on the surface of the display screen, and it is not easy to cause physical damage, therefore the operating life is long.

EMBODIMENTS

Figure 1:
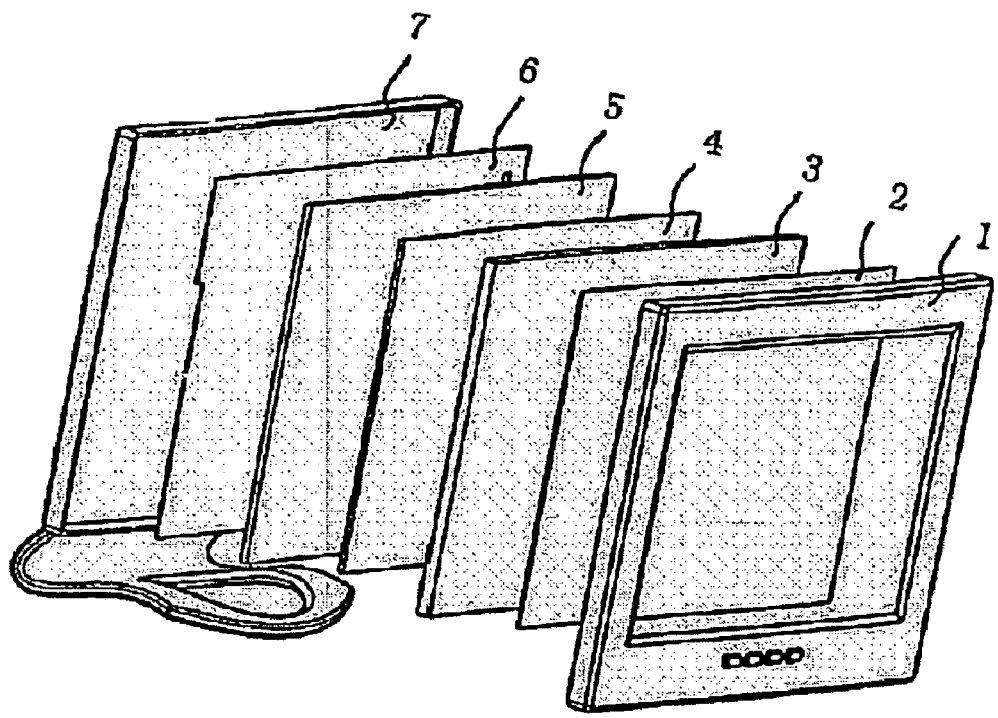
FIG. 1 is a schematic drawing of the configuration of one embodiment of the present invention.

The present invention is explained in further detail below together with the attached drawings and concrete embodiments.

Referring to FIGS. 1-4, the present invention is a display screen having an electromagnetic induction touch control function, including a flat panel display screen may unit and a touch control induction layer 4, the output of the touch control induction layer 4 being connected to a recognition circuit, and touch control of the display screen being operated by an electromagnetic input pen. The touch control induction layer 4 is placed behind the flat panel display screen 3, wherein the touch control induction layer 4 is constituted by an electromagnetic induction generation layer 41 and a bottom support bracket layer 42, wherein a base layer of the electromagnetic induction generation layer 41 is an insulated flexible membrane 411, the surface of the membrane 411 is printed with an electromagnetic induction antenna array 412, constituting a flexible membrane type electromagnetic induction generation layer 41, the output of that layer is connected to and controls the recognition circuit, and the input pen has an electromagnetic wave generation device. For the recognition circuit, any kind of handwriting tablet recognition circuit can be adopted, and therefore the present invention hereby does not further elaborate on the recognition circuit. The display screen is a flat panel type display screen such as a plasma display screen or a liquid crystal display screen.

The flat panel display screen main unit includes a front luminance body 1, a back luminance body 7, and a display screen 3. A characteristic point of the present invention is that the touch control induction layer 4 is placed behind the display screen 3, and after the electromagnetic handwriting operation pen touches and presses the display screen 3, the touch control induction layer 4 still can respond to the position contacted on the handwriting tablet through the display screen.

In a concrete structural design, the surface area of the touch control induction layer 4 is the same size as the surface area of the display screen 3. An insulating shielding isolating layer 5 is provided behind the touch control induction layer 4, and a recognition circuit layer 6 is provided behind the insulating shielding isolating layer 5. The insulating shielding isolating layer 5 respectively insulates and shields between the touch control induction layer 4 and the recognition circuit layer 6. Of course, the insulating shielding separating layer 5 and the recognition circuit layer 6 may be separately placed in another space in the display screen or main unit. However, an entire induction device can be integrated by placing the insulating shielding isolating layer 5, the recognition circuit layer 6, and the touch control induction layer 4 affixed together. In order to further ensure the shielding effect, a spatial gap is provided between the insulating shielding isolating layer 5 and the recognition circuit layer 6. Of course, if a spatial gap is retained between the shielding layer 5 and the touch control induction layer 6 [sic], there is already an insulating effect, and that shielding layer 5 itself may be a material not having an insulating layer. The shielding layer 5 is used for enhancing the anti-interference capability of the equipment.

Moreover, in order to increase the capabilities of wear resistance, and the like, of the surface of the display screen 3, a transparent protective layer or protective film 2 is provided on the front surface of the display screen 3.

Figure 2:
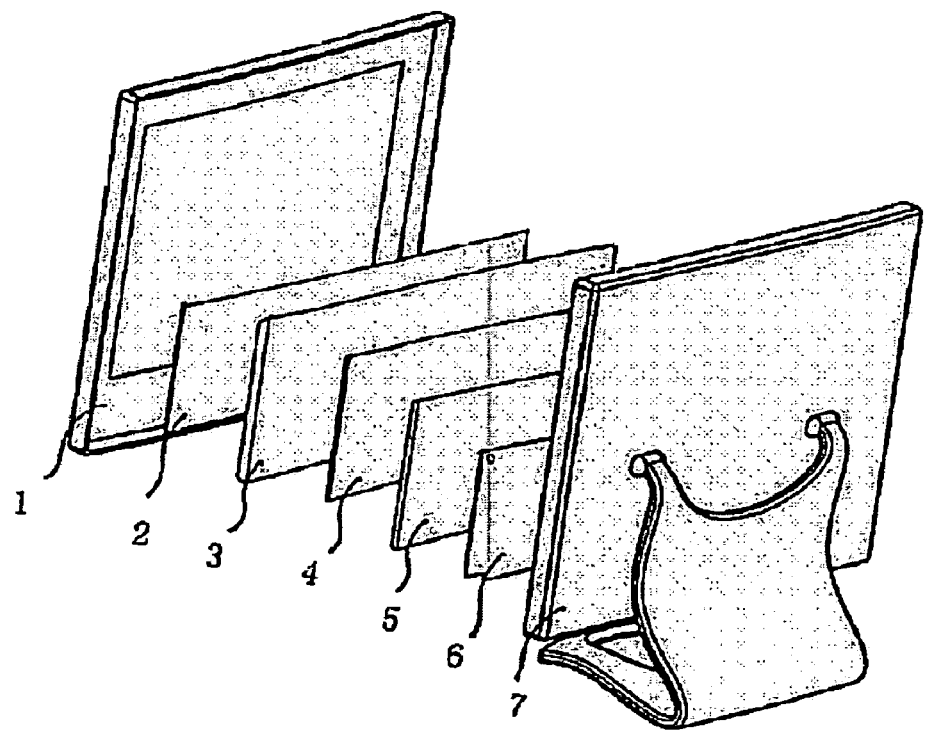
FIG. 2 is a schematic drawing of the configuration of another embodiment of the present invention.
Figure 3:
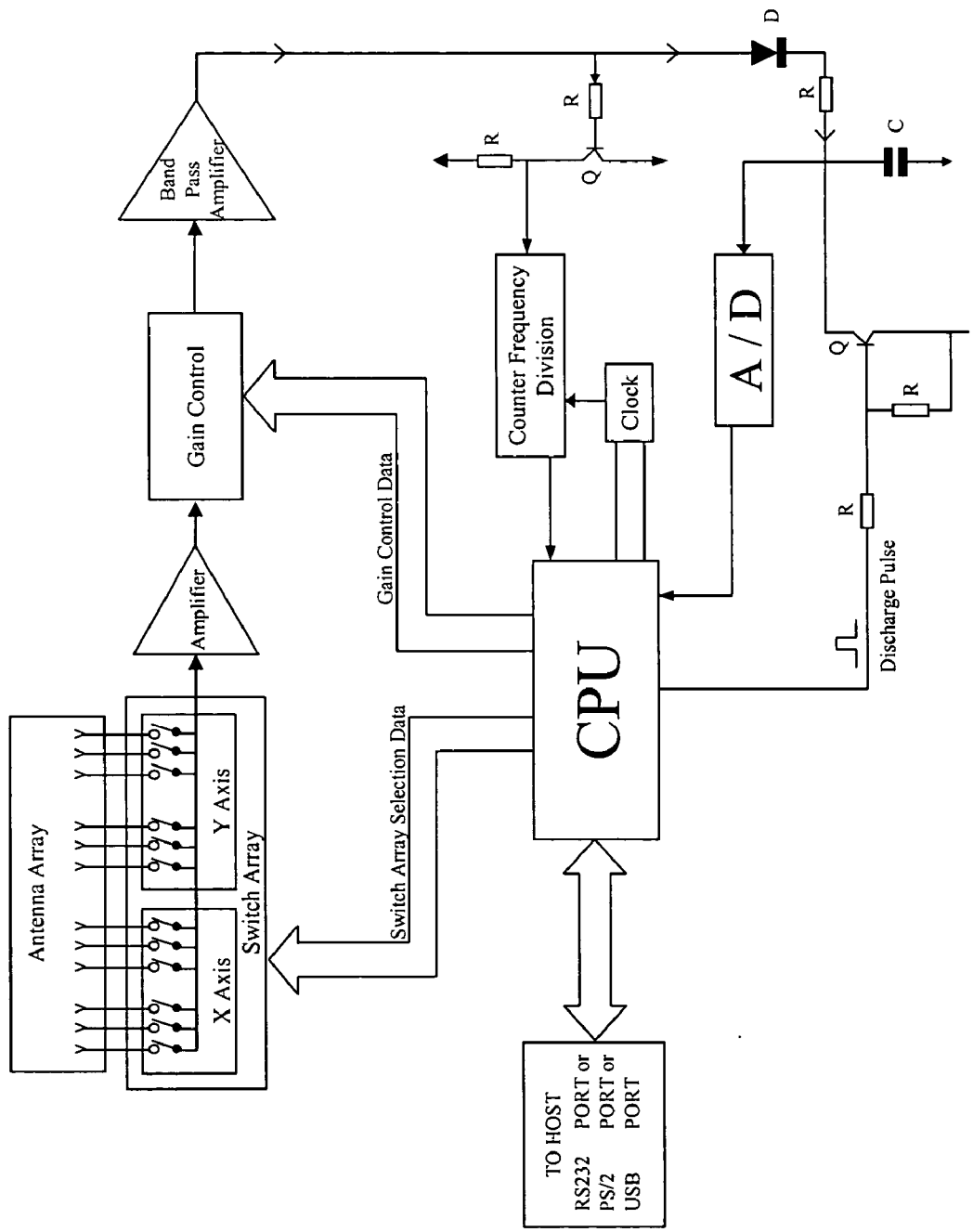
FIG. 3 is a schematic drawing of the configuration of the recognition circuit of the present invention.

As shown in FIG. 2, according to different requirements, such as when a part of the display screen 3 is made as a touch input or touch operation area, the touch control induction layer 4 may have a smaller surface area than the surface area of the display screen 3 and be placed on one side behind the display screen 3, and it also may be placed on two sides or four sides of the display screen 3. Of course, the touch control induction layer 4 may have a larger surface area than the surface area of the display screen 3, such that the entire display screen 3 and the periphery of the display screen 3 may have touch control capability.

The display screen 3 of the present invention separates the operation pen and the touch control induction layer 4, but it does not at all influence the generation and transmission of induction signals. Just as the insulating protective film of a handwriting tablet separates the handwriting operation pen and the induction layer, the operating mechanism also is the same as the signal generation of the handwriting tablet. Together with FIG. 3, while the present invention is in use, the source of induced electromagnetic signals is the electromagnetic operation pen, and the electromagnetic handwriting operation pen normally continuously emits electromagnetic signals having a fixed frequency or data. When the tip of the pen is pressed in contact, the electromagnetic field line penetrates the electromagnetic antenna array, the bottom level horizontal antennas and top level vertical antennas corresponding to the center and vicinity of the electromagnetic signal source induce the electromagnetic signals, and they are transmitted via a recognition circuit interface to a CPU. The CPU computes comparing the position of the induction antenna and voltage strength, frequency signal change, determines the position of the electromagnetic signals and various working conditions, and further transmits the results to the PC, so as to control the PC to complete various operating instructions, such as character or shape recognition, drawing and rapid key call, and the like.

Figure 4:
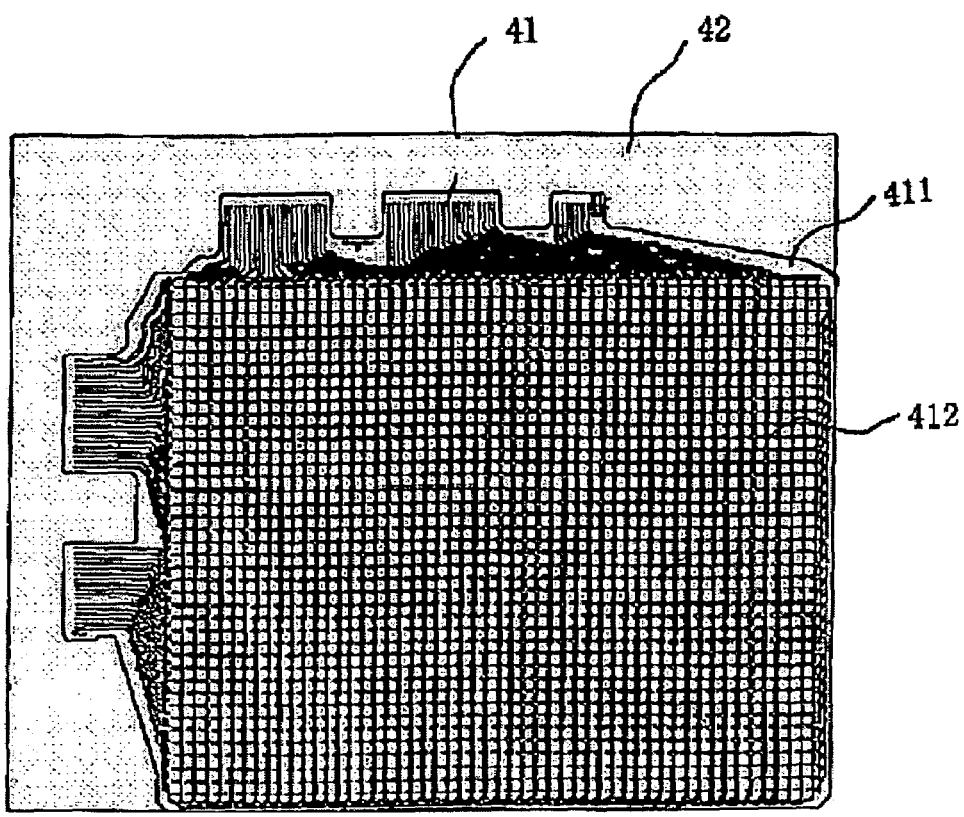
FIG. 4 is a schematic drawing of the configuration of the electromagnetic induction layer of the present invention.

Concretely, as shown in FIG. 4, the base layer of the electromagnetic induction generation layer 41 is an insulated flexible membrane 411, the surface of the membrane is printed with an electromagnetic induction antenna array 412, having a structure in which U-shaped antennas are arranged crosswise distributed respectively following X and Y axes, constituting a flexible membrane type electromagnetic induction generation layer. In order to reduce cost, the electromagnetic induction antenna array 412 is an electromagnetic induction antenna array printed with silver paste or a mixture of silver paste and carbon paste.

In order to increase the precision of recognition, the electromagnetic induction antenna array 412 has a one-sided or two-sided flexible membrane 411 printed circuit structure, and it also may have more than one one-sided flexible membrane 411 printed circuits superimposed.

The present invention can be widely used in all kinds of touch controlled equipment. At the same time, the concept of the present invention is by no means limited to combining an electromagnetic induction layer and a flat panel display screen, and electromagnetic induction layers can be combined behind non-CRT display screens such as plasma display screens and liquid crystal display screens having all kinds of shapes that are not at all flat so as to achieve a low cost touch screen structure.

The invention claimed is:

1. A flat panel display screen having touch control function, including a flat panel display screen main unit and a touch control induction layer, the output of the touch control induction layer being connected to a recognition circuit, and touch control operation of the display screen being operated by an electromagnetic input pen, characterized in that said touch control induction layer is placed behind the flat panel display screen, wherein the touch control induction layer is constituted by an electromagnetic induction generation layer and a bottom support layer, wherein a base layer of the electromagnetic induction generation layer is an insulated flexible membrane, the surface of the membrane is printed with an electromagnetic induction antenna array, constituting a flexible membrane type electromagnetic induction generation layer, the output of that layer is connected to and controls the recognition circuit, the electromagnetic induction antenna array is configured to respond to the touch control operation through the display screen so as to generate the output and the input pen has an electromagnetic wave generation device.

2. A flat panel display screen having touch control function as recited in claim 1, characterized In that: the surface area of said touch control induction layer is the same as the surface area of the flat panel display screen.

3. A flat panel display screen having touch control function as recited in claim 1, characterized in that: the surface area of said touch control induction layer is smaller than the surface area of the flat panel display screen.

4. A flat panel display screen having touch control function as recited in claim 3, characterized in that: said touch control induction layer is placed on one side behind the flat panel display screen.

5. A flat panel display screen having touch control function as recited in claim 3, characterized in that: said touch control induction layer is placed on one or more sides behind the flat panel display screen.

6. A flat panel display screen having touch control function as recited in claim 1, characterized in that: the surface area of said touch control induction layer is larger than the surface area of the flat panel display screen.

7. A flat panel display screen having touch control function as recited in claim 1, characterized in that: said flexible membrane is a film material.

8. A flat panel display screen having touch control function as recited in claim 1, characterized in that: said electromagnetic induction generation layer is an electromagnetic induction antenna array distributed respectively following X and Y axis.

9. A flat panel display screen having touch control function as recited in claim 8, characterized in that: said electromagnetic induction antenna array having a structure in which U-shaped antennas are arranged crosswise.

10. A flat panel display screen having touch control function as recited in claim 1, characterized in that: said electromagnetic induction antenna array is an electromagnetic induction antenna array of silver paste or mixture of silver paste and carbon paste printed on the flexible membrane.

11. A flat panel display screen having touch control function as recited in claim 10, characterized in that: said electromagnetic induction antenna array has a one-sided or two-sided printed circuit structure on the flexible membrane.

12. A flat panel display screen having touch control function as recited in claim 10, characterized in that: said electromagnetic induction antenna array has one or more one-sided printed circuits superimposed.

13. A flat panel display screen having touch control function as recited in claim 1, characterized in that: an insulating shielding isolating layer is provided behind said touch control induction layer, and a recognition circuit layer is provided behind the insulating shielding isolating layer.

14. A flat panel display screen having touch control function as recited in claim 13, characterized in that: a spatial gap is provided between said insulating shielding isolating layer and recognition circuit layer.

15. A flat panel display screen having touch control function as recited in claim 1, characterized in that: said display screen is a plasma display screen or a liquid crystal display screen.

16. A flat panel display screen having touch control function as recited in claim 1, characterized in that: a protective layer is provided in front of said display screen.

* * * * *